United States Patent [19]

Stoy

[11] 4,331,783

[45] May 25, 1982

[54] NOVEL BLOCK COPOLYMERS INCLUDING ACRYLONITRILE SEQUENCES AND GLUTARIMIDE UNITS AND PROCESSES FOR PREPARING SAME

[75] Inventor: Vladimir A. Stoy, Princeton, N.J.

[73] Assignee: S.K.Y. Polymers, N.J.

[21] Appl. No.: 188,224

[22] Filed: Sep. 17, 1980

[51] Int. Cl.³ .................. C08F 293/00; C08F 220/48; C08F 220/52
[52] U.S. Cl. .................................. 525/294; 525/280; 525/336; 525/340; 525/344; 525/374; 525/377
[58] Field of Search .............. 525/294, 296, 336, 340, 525/344, 374, 377, 280

[56] References Cited

U.S. PATENT DOCUMENTS

| | | | |
|---|---|---|---|
| 3,897,382 | 7/1975 | Stoy et al. | 525/336 |
| 3,926,930 | 12/1975 | Ohfuka et al. | 525/377 |
| 3,948,870 | 4/1976 | Stoy et al. | 525/336 |
| 4,169,924 | 10/1979 | Barabas et al. | 525/377 |

Primary Examiner—Carman J. Seccuro
Attorney, Agent, or Firm—Louis E. Marn; Elliot M. Olstein

[57] ABSTRACT

There is disclosed block copolymers having acrylonitrile sequences and sequences of glutarimide units of a molecular weight of form about 10,000 to about 2,000,000 where the acrylonitrile sequences and sequences including glutarimide units are of a molecular weight of at least about 400 with the number of sequences being at least about 2 and preferably 5 and higher.

12 Claims, No Drawings

NOVEL BLOCK COPOLYMERS INCLUDING ACRYLONITRILE SEQUENCES AND GLUTARIMIDE UNITS AND PROCESSES FOR PREPARING SAME

FIELD OF THE INVENTION

This invention relates to novel block copolymers including acrylonitrile sequences, and more particularly to novel block copolymers comprised of acrylonitrile sequences and sequences including as a major portion glutarimide units and process for preparing same. This is a continuation-in-part of application Ser. No. 166,032 filed July 7, 1980.

BACKGROUND OF THE INVENTION

In copending applicaton U.S. Ser. No. 166,032 filed July 7, 1980, there are disclosed novel polymer compositions comprised of polyacrylonitrile polymer and block copolymer having acrylonitrile and non-crystalline polymer sequences and a process for forming such polymer compositions. Block copolymers of acrylonitrile sequences with another polymer sequences, for example, acrylamide are a two phase structure separated into domains wherein the acrylonitrile domain has a like crystalline structure to polyacrylonitrile polymer.

Such block copolymers may be readily formed by the controlled acid catalyzed hydrolysis of polyacrylonitrile polymer, and are highly swellable in water with a swelling capacity dependent on the ratio of both sequences and on the number of separate domains. Generally, the block copolymers exhibit considerable strength in the swollen state caused by the two phase structure and crystallinity of the acrylonitrile domains. The block copolymers have been shaped by pressure in the swollen state or from thermo-reversible gels (TRG), such as disclosed in U.S. Pat. No. 4,053,442 and No. 4,173,606, respectively.

With the acid catalyzed hydrolysis of polyacrylonitrile to form the acrylonitrile-acrylamide (and some acrylic acid units) block copolymers, some glutarimide units may be formed, and if formed, are small and in an amount insufficient to influence the properties of the acrylic acid-acrylamide block copolymers, i.e. hydrophilicity. The multi-block copolymers of acrylonitrile sequences with acrylamide or acrylamide and acrylic acid sequences exhibit excellent mechanical properties, but their use is limited by water swelling capabilities.

Under certain conditions, the acid catalyzed hydrolysis of polyacrylonitrile yields water insoluble copolymers (not block copolymers) of a high glutarimide content but without acrylonitrile units in crystallizable sequence. Such glutarimide containing copolymers exhibit poor mechanical properties and are, as a rule, considered to be undesirable intermediate products of a process leading to the water-soluble acrylic polymers, i.e. polyacrylic acid or the water-soluble acrylamideacrylic acid copolymers.

OBJECTS OF THE INVENTION

An object of the present invention is to provide novel block copolymers.

Another object of the present invention is to provide novel block copolymers having acrylonitrile sequences and sequences including glutarimide units.

Still another object of the present invention is to provide novel block copolymer compositions having acrylonitrile sequences and sequences including glutarimide units and exhibiting outstanding mechanical properties.

Another object of the present invention is to provide novel block copolymers having acrylonitrile sequences and sequences including glutarimide units and having a major proportion of glutarimide units thereby exhibiting properties of high impact resistance.

Still another object of the present invention is to provide novel processes for preparing such novel block copolymers.

A further object of the present invention is to provide novel processes for preparing such novel block copolymers from polyacrylonitrile polymers.

SUMMARY OF THE INVENTION

These and other objects of the present invention are achieved by block copolymers having acrylonitrile sequences and sequences of glutarimide units of a molecular weight of from about 10,000 to about 2,000,000 where the acrylonitrile sequences and sequences including glutarimide units are of a molecular weight of at least about 400 with the number of sequences being at least about 2 and preferably 5 and higher. The properties of the novel block copolymers are preselectable by varying the mole percent of acrylonitrile to glutarimide in the block copolymers as well as by varying the number and the molecular weight of the sequences.

The block copolymers of the present invention are readily prepared from block copolymers of acrylonitrile sequences with acrylamide sequences or acrylamide and acrylic acid sequences in the presence of an acid catalyst. In one embodiment, the block copolymers of the present invention are prepared directly from polyacrylonitrile.

DETAILED DESCRIPTION OF THE INVENTION

The block copolymers of the present invention are comprised of acrylonitrile sequences and sequences including as a major portion glutarimide units, and are essentially a two phase structure with an acrylonitrile and glutarimide domains wherein the acrylonitrile domains exhibit crystalline structure similar to polyacrylonitrile and the glutarimide domains exhibit an amorphous structure.

An acrylonitrile sequence is a continuous sequence of acrylonitrile units of a molecular weight of at least about 400, and preferably of at least about 600. The sequences including a major portion of glutarimide units is a continuous sequence having a molecular weight of at least about 400 and preferably at least about 750. The number of sequences per polymer chain is at least 2 and preferably of from 5 to about 1,000, preferably not more than about 250.

The block copolymers of the present invention are comprised of two types of rigid, water non-swellable blocks which are incompatible with one another. Notwithstanding, solubility in some common solvents for polyacrylonitrile and polyglutarimide, such types form two phase structure once the solvents are removed. One of the phases is comprised of a major portion of the acrylonitrile sequences and form crystalline domains of a crystalline structure similar to the crystalline structure of polyacrylonitrile. A typical structural feature of the crystalline domains manifests itself by the x-ray diffraction pattern with a main reflexion corresponding to the periodicity of about 5.2 Å which can be rearranged under stress to the equatorial position indicating a lateral organization. The other phase is essentially amorphous and are the sequences containing as a major portion, the glutarimide units.

The difference is structural configuration between polyglutarimide and polyacrylamide, i.e. chain structure versus potential to intra-chain bonding result in decreased swelling capacity and increased thermal resistance of the blocked copolymers of the present invention compared with block copolymers of acrylonitrile sequences with sequences of acrylamide units or acrylamide and acrylic acid units. The block copolymers of the present invention exhibit, inter alia, the following properties:

1. High tensile strength, high modulus of elasticity and high impact resistance in both the dry and swelled states;
2. Deformation and orientation at elevated temperatures under stress facilitating processing and shaping of the block copolymers;
3. Temperature resistance and slow change of mechanical properties to temperature change;
4. Controllable swelling capacity from about 0.2 to about 40% by weight of water regardless of acrylonitrile content;
5. Controllable differences between the properties in the dry and the swollen states;
6. Barrier properties to most of the organic solvents, especially to alcohols, ketones, aliphatic and aromatic hydrocarbons and their halogenated derivatives;
7. Controlled permeability to water and aqueous solutes including gases, such as oxygen and carbon dioxide;
8. Excellent barrier properties to gases when the swellability is less than about 5 percent by weight of water; and
9. Good hydrolytic resistance in contact with water and acidic and neutral aqueous solutions.

The amount of the acrylonitrile units of the block copolymers may vary from about 1 to about 99 mole percent, and preferably of from about 5 to about 95 mole percent. For one set of blocked copolymers, the amount of the acrylonitrile units is from about 50 to about 99 mole percent, preferably from about 50 to about 95 mole percent whereas for another set of block copolymers the amount of acrylonitrile is from about 5 to about 50 mole percent.

For block copolymers having from 50 to 99 mole percent acrylonitrile, i.e. 1 to 50 mole percent of the sequence including a major portion of the glutarimide units, the fibrillar structure is well developed with the amorphous phase forming envelopes of the polyacrylonitrile fibriles thereby exhibiting mechanical properties resembling polyacrylonitrile, namely, readily stress orientable thereby forming a laterally organized structure. Such block copolymers are particularly useful in the manufacture of products requiring high strength, barrier properties, high resistance to water and organic solvents, namely products such as tubings, bottles, containers, fuel tanks, wrapping foils and the like. The content of the glutarimide units for these block copolymers is preferably of from 5 to 40 mole percent.

The block copolymers of the present invention having of from 1 to 50 mole percent of acrylonitrile averaged in sequences exhibit a two phase structure forming more or less a continuous fibrillar network throughout the amorphous phase of sequences of the glutarimide units, or discrete "knots" of the crystalline domains binding the glutarimide-containing polymer chains into a continuous physical network. The continuous polyacrylonitrile prevails of the acrylonitrile content is more than about 33 mole percent, while the discrete domains of polyacrylonitrile embedded in the continuous amorphous phase prevail beyond such range. The block copolymers having less than 50 mole percent acrylonitrile possess outstanding mechanical strength but with reduced orientatability and are very tough and impact resistant.

The block copolymers may be formed with hydrophobic units, such as acrylamide and/or acrylic acid units incorporated into the glutarimide sequences thereby increasing the flexibility as well as hydrophilicity thereof of the sequences including the glutarimide units, as much as 49 mole percent preferably less than 35 mole percent and advantageously below about 25 mole percent may be formed of such hydrophilic units.

The primary difference between polyacrylonitrile and the novel block copolymers of the present invention is that while polyacrylonitrile is a single-phase structure, the block copolymers are comprised of preformed fibriles of finite size rearrangeable under stress as whole units without being substantially internally reorganized. In the single phase of polyacrylonitrile, there are none such pre-organized structures so that polyacrylonitrile must be completely reorganized under stress to obtain orientation. The effects of this difference are enhanced shaping of the copolymer compositions and improved strength, tear strength and impact resistance. The hydrophobic nature of the glutarimide containing sequences result in properties not impaired by contact with water as is the case with the hereto known multiblock copolymers of acrylonitrile.

The block copolymers are soluble in highly polar solvents, such as the hereinabove mentioned polyacrylonitrile solvents, or in mixture of such solvents with other polar solvents, e.g. dimethyl sulfoxide DMSO, DMSO-glycerole mixture, dimethylformamide (DMF) concentrated nitric acid (50–75%), and others. Additionally, the block copolymers are considerably stable with regard to acids, even concentrated acids such as sulfuric and nitric acids, and thus, are not readily hydrolyzable in neutral or acidic solutions even at elevated temperatures. On the other hand, the block copolymers are readily attacked by bases as disclosed in copending application (12279) to form other novel block copolymers.

The block copolymers of the present invention are distinguishable from other copolymers, as follows:

(1) IR spectroscopy reveals CN-band at 2240 cm$^{-1}$ and glutarimide-band at about 1200–1220 cm$^{-1}$ together with a CH$_2$ band at 2940 cm$^{-1}$ which can be used as an internal standard for quantitative estimation of the acrylonitrile and glutarimide concentration.

(2) Treatment of the copolymers by an aqueous solution of NaOH (p$_H$ 8 to 10) causes considerable swelling of the copolymers and vanishing of the glutarimide-band in the IR-spectrum.

(3) Potentiometric titration of the copolymers dissolved in DMSO by very diluted aqueous NaOH solutions reveals two waves corresponding to the content of the —COOH groups present in the copolymer and the content of the —COOH groups formed by the hydrolysis of glutarimide. The molar content of the latter corresponds to the molar content of glutarimide prior to the titration.

(4) Treatment of the copolymer with warm 10% aqueous NaOH solution causes extensive swelling and eventual dissolution in water accompanied by vanishing of both acrylonitrile and glutarimide bands in the IR spectrum. The copolymers simultaneously turns to yellow, orange, red or brown; this change of color indicates that the acrylonitrile groups were arranged in continuous sequences.

(5) X-ray diffraction reveals a pattern identical to that of polyacrylonitrile itself, but the crystalline reflexes are accompanied by an amorphous halo. This indicates that two phase structure with the crystalline and the amorphous domains.

(6) $^{13}C$ NMR spectroscopy permits the thorough analysis with proof of concentration of both acrylonitrile and glutarimide and determination of the length of the respective sequences.

(7) The considerable reactivity of glutarimide provides another tool for identification of the copolymer according to the present invention.

The novel block copolymers are readily prepared by treating block copolymers having acrylonitrile sequences with acrylamide or acrylamide and acrylic acid sequences (no more than 66 mole percent acrylic acid based upon the acrylamide and acrylic acid content) with acid catalysts at a temperature of from about 15° to about 185° C., preferably of from 35° to 125° C. and generally in the presence of a highly polar solvent.

The acid catalyst include hydrochloric acid, hydrofluoric acid, trifluoracetic acid, nitric acid, sulphuric acid, phosphoric acid, toluenesulfonic acid, sulfur trioxide, nitrogen oxides and like strong acids. The highly polar solvents include those polyacrylonitrile solvents, such as nitric acid, dimethylsulfoxide (DMSO), DMSO-glycerol solutions, dimethylformamide (DMF) and the like. It is noted that nitric acid (like other strong acids) is a complex mixture of compounds-non-ionized pseudo-acids (which is a solvent) and various hydrates (which are catalysts). The composition depends on dilution (increased concentration leads to increased concentration of pruedo-acids).

It will be understood that not all of the acrylamide units or acrylamide and acrylic acid units may be converted to the glutarimide units due to odd number juxtaposition of the acrylamide and acrylic acid units.

Reaction times are from about 0.5 to 300 minutes or longer with longer reaction times required to form block copolymers of greater concentration of glutarimide units.

As hereinabove discussed, block copolymer precursor of the present invention may be prepared by diverse manners and does not constitute a part of the present invention. As readily understood by one skilled in the art, the formation of the glutarimide units involves cyclization reactions of acrylamide units or acrylamide and acrylic acid units, and has been observed to be particularly accelerated in the presence of nitrogen oxides, particularly the oxide of nitric acid.

The use of nitric acid is particularly advantageous since the formation of the precursor block copolymer may be effected in the presence of nitric acid with subsequent hydrolysis of the block copolymer precursor being effected by increasing the temperature (to about 30° to 60° C.) with concomitant introduction of a small amount of a reducing agent. Additionally, recovery of the block copolymer in the presence of nitric acid, as more fully hereinafter discussed, is facilely effected by addition to the system of a neutralizing agent, such as urea, quanidine, potassium carbonate and the like.

Recovery of the block copolymers of the present invention may be effected in a plurality of ways depending on the reaction system in which the block copolymers are formed. If the solvent and/or acid catalyst are sufficiently volatile, the block copolymer is recovered by evaporation of the solvent and/or catalyst. Volatile acid catalyst include $SO_3$, HCl, HF, $NO_x$, and the like with volatile solvents including DMSO, DMF and nitric acid. The block copolymers are readily extracted from the reaction systems with a liquid miscible therewith but immiscible with the dissolved block copolymers. Such miscible liquids include water, aqueous solutions, low aliphatic alcohols, ketones, glycols and the like. The block copolymer may be recovered by neutralization of the acid catalyst as hereinabove discussed. In this regard, some of the solvent may be neutralized, e.g. neutralization of zinc chloride by sodium carbonate. In the preparation of sponges, it is advantageous to neutralize the solvent under conditions to form a water insoluble salt thereby forming a solid salt-block copolymer whereby subsequent extraction of the salt results in the desired cell structure.

For certain applications, the block copolymer of the present invention is subjected to a reaction system to hydrolyze the glutarimide units to acrylamide units and results in a block copolymer assisting essentially of acrylonitrile and acrylamide sequences, i.e. a block copolymer without carboxylic groups.

EXAMPLES OF THE INVENTION

The following examples are illustrative of conditions for the process of the present invention and it is to be understood that the scope of the invention is not to be limited thereby.

EXAMPLE I

The precursor multiblock acrylonitrile-acrylamide copolymer is prepared in a conventional manner by dissolving polyacrylonitrile (M.W.150,000) in a solution of 70% nitric acid and 98% sulfuric acid (weight ratio of the acids 2:1). The solution is maintained at 15° C. until 38 mole percent of the acrylonitrile groups are hydrated with the resulting copolymer isolated by pouring the solution into an excess of water to precipitate the block copolymer. The washed and dried acrylonitrile-acrylamide block copolymer contained 55 percent weight of acrylonitrile units arranged in sequences with an average molecular weight of 1,500; 43.5 percent by weight of acrylonitrile units and 1.5 percent by weight of acrylic acid units arranged into sequences with an average molecular weight of 1230.

Twenty parts by weight of the resulting block copolymer are dissolved at 110° C. in 180 parts by weight of DMSO and into which is introduced a stream of dry nitrogen mixed with HCl. After 30 minutes, the resulting solution is cooled with one-half poured into an excess of water. The precipitated block copolymer is washed with methanol and vacuum-dried. The product had the following composition: 57.4 percent by weight of acrylonitrile units arranged into the sequences with average molecular weight of about 1,500; 33.2 percent by weight of glutarimide units and 9.4 percent by weight of acrylamide units arranged randomly into sequences with an average molecular weight of 1110.

The product is practically non-swellable in water and exhibits an x-ray diffraction typical of a polyacrylonitrile pattern with a main reflexion corresponding to about 5.2 Å with an accompanying amorphous halo.

Fifty parts by weight of the powdered block copolymer (AN-GIM-AM) are mixed with fifty parts by weight of dimethylformamide and extruded at 140° C. through a slot nozzel into a water bath. The thus formed membrane is washed and monaxially oriented at 150° C. to yield an oriented transparent foil possessing excellent mechanical and barrier properties.

EXAMPLE II

The solution of Example I resulting from the step of hydrochloride introduction is heated to 75° C. and contacted with air to remove hydrochloride. Gaseous $NH_3$ at a partial premise of 1.2 atmosphere is thereafter bubbled with the solution with subsequent air evacuation. The resulting block copolymer is coagulated with water and analyzed as containing 61.8 mole percent acrylonitrile and 38.2 mole percent acrylamide, with no acrylic acid unit present.

EXAMPLE III

Polyacrylonitrile (M.W.=875,000) is dissolved in an aqueous solution of sodium rhodanide and sodium hydroxide (60 percent by weight and 5% percent by weight, respectively). The polymer solution is heated to 75° C. until the polymer gelled (turned to dark red-brown) and then redissolved (honeyyellow color). The thus formed copolymer is precipitated by water and is a highly swellable multiblock copolymer (about 97% by weight of water) consisting of 11 mole percent of acrylonitrile, 52 mole percent of acrylamide and 37 mole percent of sodium acrylate. The solution is cooled and extruded into water to form a membrane about 0.5 mm. thick in a swollen state. The swollen membrane is washed and exposed on one side to a 10 percent nitric acid solution.

The membrane contracted as whole (the sodium acrylate is converted into acrylic acid) and a skin of yellow, turbid, non-swellable polymer about 0.1 mm. thick is formed on the exposed side. Analysis of the skin revealed a multiblock copolymers of acrylonitrile-glutarimide-acrylamide (19.7 mole percent acrylonitrile; 66.8 mole percent of glutarimide; 13.4 mole percent of acrylamide; 0.1 mole percent of acrylic acid) with an average molecular weight of the acrylonitrile sequences of 550. The membrane is fixed in a frame and dried. When swelled again, the membrane is formed of two layers, one of which is highly swellable in water and highly permeable to aqueous solutes while the other layer is essentially non-swellable and non-permeable. Asymetric membranes of such type are useful in ultrafiltration techniques.

EXAMPLE IV

Twenty percent by weight acrylonitrile and eighty percent by weight of 68% nitric acid is mixed with 0.2 percent by weight of ammonium persulfate and maintained at 20° C. until 85 mole percent of the acrylonitrile is converted to acrylamide (less that 2% acrylic acid units). Five weight percent of 10% aqueous sodium meta-bisulfate is added and the polymer solution maintained at 45° C. for five hours. The solution is cooled and there is added 52 percent by weight urea with the mixture thereafter kneaded and extruded at a barrel temperature of 50° C. to form granules or pellets. The granules are admixed with calcium carbonate. The granules constituted poorly soluble ureamononitrate encapsulated in water non-swellable block copolymers of acrylonitrile-acrylamide-glutarimide sequences (51 mole percent glutarimide, 24.7 mole percent acrylomide and 22.7 mole percent acrylonitrile) and protected the nitrate from dissolving.

The acidic ureamononitrate protected the block copolymer against hydrolysis by alkali as long as the same is present in the outer layer. The ureamononitrate reacted with the calcium carbonate to form soluble calcium nitrate and urea. Upon depletion of the ureamononitrate, the outer layer of the block copolymer became hydrolyzed gradually as the pH reached 7.0 and thus converted into a highly permeable multiblock hydrogel thereby further exposing ureamononitrate. The net result is enhanced utilization of the nitrogen as a plait nutrient as well as diminished pollution of water by dissolved nitrates. Additionally, the hydrogel particles acted as a soil-conditioner and accumulator for water.

EXAMPLE V

The process of Example IV is repeated except that only 40 percent by weight urea is added and the product extruded with crystalline sodium carbonate at ambient temperatures into water to form a spongy foam sheet. The sheet is washed with isopropanol aqueous solution and finally with a 3% glycerol in methanol solution. The resulting material is centrifuged and dried to form highly swellable sponges for medical purposes.

EXAMPLE VI

Fifty parts by weight of a polyacrylonitrile-styrene copolymer (90:10 by weight, M.W.=50,000) is mixed at 60° C. with 40 parts by weight of $ZnCl_2$, 10 parts by weight of 37 percent HCl and 8 parts by weight of water. The masses is masticated at 60° C. for three hours in a kneader. A rubbery solution is extruded into a coagulation bath of 20 percent aqueous of $ZnCl_2$ at 4° C. and thence extracted through a screw having a barrel temperature of 100° C. and a head temperature of 125° C. The thus formed pipe is washed with water and then in a one percent solution of sodium bicarbonate. The block copolymer analyzed as 7.5 mole percent of glutarimide with an x-ray analysis revealing a two-phase structure.

The inner surface of the pipe is treated with a solution of caustic soda for several minutes at ambient temperature and forms a thin hydrogel layer. The frictional factor of water running through the tube is about 15 percent lower than for PVC pipe of like dimension. A portion of the tube is sliced into 1 inch lengths for use as loose packing in an absorber tower. The efficiency of the packing for absorbing ammonia into water from a mixture thereof is nearly twice that of polypropylene packing having like geometry.

Numerous modifications and variations of the present invention are possible in light of the above teachings and, therefore, within the scope of the appended claims, the invention may be practised otherwise than as particularly described.

What is claimed:

1. A novel block copolymer of a molecular weight of from 10,000 to 2,000,000 comprised of acrylonitrile sequences and sequences comprised of a major portion of glutarimide units said acrylonitrile sequences having a molecular weight of at least 400, said sequence of said major portion of glutarimide units having a molecular weight of at least 400.

2. The block copolymers as defined in claim 1 wherein said molecular weight is from 40,000 to 550,000.

3. The block copolymer as defined in claims 1 or 2 wherein said molecular weight of said acrylonitrile sequences is preferably at least 600 and said molecular weight of said other sequences is preferably at least 750.

4. The block copolymer as defined in claim 3 wherein there are at least two acrylonitrile sequences and at least two of the other sequences.

5. The block copolymer as defined in claim 4 wherein there are preferably at least five sequences.

6. The block copolymer as defined in claims 4 or 5 wherein said acrylonitrile sequences equal the sequences of said major portion of glutarimide units.

7. The block copolymer as defined in claims 1 or 2 wherein said acrylonitrile sequences comprises of from 1 to 99 mole percent said block copolymer.

8. The block copolymer as defined in claim 7 wherein said acrylonitrile sequences comprised of from 50 to 95 mole percent of said block copolymer.

9. The block copolymer as defined in claim 7 wherein said acrylonitrile sequences comprised of from 1 to 50 mole percent of said block copolymer composition.

10. The block copolymer composition as defined in claims 1 or 2 wherein said sequences including a major portion of said glutarimide units also include acrylamide units.

11. The block copolymer composition as defined in claims 1 or 2 wherein said sequences including a major portion of glutarimide units also include acrylamide and acrylic acid units.

12. The block copolymer as defined in claims 10 or 11 wherein said sequences including glutarimide units includes at least 55 mole percent of said glutarimide units.

* * * * *